(12) United States Patent
Blau et al.

(10) Patent No.: US 8,531,152 B2
(45) Date of Patent: Sep. 10, 2013

(54) SOLAR BATTERY CHARGER

(75) Inventors: David Blau, Chico, CA (US); Melvin James Bullen, Los Gatos, CA (US)

(73) Assignee: Solar Components LLC, Campbell, CA (US)

( * ) Notice: Subject to any disclaimer, the term of this patent is extended or adjusted under 35 U.S.C. 154(b) by 306 days.

(21) Appl. No.: 12/831,932

(22) Filed: Jul. 7, 2010

(65) Prior Publication Data

US 2011/0006727 A1 Jan. 13, 2011

Related U.S. Application Data

(60) Provisional application No. 61/224,835, filed on Jul. 10, 2009.

(51) Int. Cl.
*H02J 7/35* (2006.01)
*H02J 7/00* (2006.01)

(52) U.S. Cl.
USPC ........... 320/101; 320/117; 320/118; 320/116; 320/120; 320/124

(58) Field of Classification Search
USPC ........................................................ 320/101
See application file for complete search history.

(56) References Cited

U.S. PATENT DOCUMENTS

| | | | |
|---|---|---|---|
| 3,696,286 A | 10/1972 | Ule | |
| 4,636,425 A | 1/1987 | Johnson et al. | |
| 4,759,735 A | 7/1988 | Pagnol et al. | |
| 4,848,320 A | 7/1989 | Burns et al. | |
| 5,498,297 A | 3/1996 | O'Neill et al. | |
| 5,952,815 A * | 9/1999 | Rouillard et al. | 320/116 |
| 6,262,558 B1 | 7/2001 | Weinberg | |
| 6,433,522 B1 * | 8/2002 | Siri | 323/272 |
| 6,483,093 B1 | 11/2002 | Takemura et al. | |
| 6,844,779 B2 | 1/2005 | McEwen | |
| 7,158,389 B2 | 1/2007 | Yasumura | |
| 7,268,527 B2 | 9/2007 | Horner | |
| 2005/0062456 A1 * | 3/2005 | Stone et al. | 320/116 |
| 2005/0134212 A1 * | 6/2005 | Chuang | 320/101 |
| 2006/0185727 A1 | 8/2006 | Matan | |
| 2006/0281229 A1 | 12/2006 | Koh et al. | |
| 2007/0204187 A1 | 8/2007 | DeMarco et al. | |
| 2007/0222410 A1 | 9/2007 | Lee | |
| 2008/0030955 A1 | 2/2008 | Chen et al. | |
| 2008/0094025 A1 | 4/2008 | Rosenblatt et al. | |
| 2008/0135092 A1 | 6/2008 | Corrales | |
| 2008/0169784 A1 * | 7/2008 | Chung et al. | 320/101 |
| 2008/0185915 A1 * | 8/2008 | Wang | 307/64 |

(Continued)

OTHER PUBLICATIONS

PCT International Search Report and the Written Opinion mailed Sep. 20, 2010, in related International Application No. PCT/US2010/041233.

PCT International Search Report and the Written Opinion mailed Sep. 15, 2010, in related International Application No. PCT/US2010/041610.

International Preliminary Report on Patentability and the Written Opinion mailed Jan. 19, 2012, in related International Application No. PCT/US2010/041233.

(Continued)

*Primary Examiner* — Yalkew Fantu
(74) *Attorney, Agent, or Firm* — Haynes and Boone LLP

(57) ABSTRACT

A personal solar appliance (PSA) is presented that collects and stores solar energy. A method of charging a battery from a solar cell according to some embodiments is presented that includes applying power from a bootstrap circuit when the battery has a very low state of charge or the solar cell has output below a threshold; and applying power from a maximum power point circuit when the battery and the solar cell provide power above the threshold.

16 Claims, 7 Drawing Sheets

(56) References Cited

U.S. PATENT DOCUMENTS

| | | |
|---|---|---|
| 2008/0276983 A1 | 11/2008 | Drake et al. |
| 2009/0079385 A1 | 3/2009 | Xiao et al. |
| 2009/0128086 A1* | 5/2009 | Lee .............................. 320/101 |
| 2009/0128089 A1* | 5/2009 | Patino et al. ................. 320/101 |
| 2009/0179611 A1* | 7/2009 | Sander et al. ................. 320/101 |
| 2010/0013309 A1 | 1/2010 | Rosenblatt et al. |
| 2010/0154887 A1 | 6/2010 | Bullen et al. |
| 2010/0176760 A1 | 7/2010 | Bullen |
| 2011/0005576 A1 | 1/2011 | Bullen et al. |
| 2012/0161692 A1* | 6/2012 | Kobayashi et al. ........... 320/101 |

OTHER PUBLICATIONS

International Preliminary Report on Patentability and the Written Opinion mailed Jan. 19, 2012, in related International Application No. PCT/US2010/041610.

V. Salas, E. Olias, A. Barrado, and A. Lazaro, *Review of the Maximum Power Point Tracking Algorithms for Stand-Alone Photovoltaic Systems*, Solar Energy Materials and Solar Cells 90, (Elsevier 2006), pp. 1555-1578.

* cited by examiner

SOLAR BATTERY CHARGER

RELATED APPLICATIONS

The current application claims priority to U.S. Provisional Application 61/224,835, filed on Jul. 10, 2009, which is herein incorporated by reference in its entirety.

BACKGROUND

1. Field

The present invention is related to solar energy generation and storage and, in particular, to a personal solar appliance for generation and storage of solar energy.

2. Discussion of Related Art

Solar cells or photovoltaic cells can be considered large area semiconductor diodes that convert sunlight into electrical current, which is used to produce usable power. The output power of the solar cell depends on multiple factors such as sunlight intensity, temperature, orientation of the cells with respect to the sun, and efficiency of the solar cells.

Photovoltaic systems, using solar panels, directly convert sunlight into energy using the principles of the photoelectric effect. The photoelectric effect takes advantage of the properties of semiconductor materials, with silicon being the primary material used in photovoltaic solar cells. When photons strike the solar cell, electrons in the semiconductor material are freed and allowed to flow as electricity. The direct current (DC) electricity produced can be directly used to charge batteries. The DC current can also be coupled to an inverter to power alternating current (AC) components or the AC current be connected to a local electrical power grid.

Traditional photovoltaic systems are based on silicon. Silicon ingots are sliced into wafers that are fabricated into cells. Cells are combined into modules, which are packaged into end-user systems. Silicon-based solar cells typically have efficiencies up to about 18%. Semiconductor materials, like gallium arsenide, have efficiencies that approach 40%, but are much higher costs than silicon. Gallium arsenide, therefore, is not currently economically practical for many terrestrial applications and is used for the most part on spacecraft and interplanetary robots. Thin film technologies use a variety of semiconductors but their efficiency is typically less than 10%.

A battery charger is a device used to put energy into a rechargeable battery by forcing an electric current into the battery. The charge current for a battery depends upon the technology and capacity of the battery being charged. For example, the current that should be applied to recharge a 12 volt car battery (several Amps) will be very different from the current that should be applied for recharging a mobile phone battery (e.g., 250 mA to 1000 mA). However, solar cell output current can be utilized to charge any battery.

In many areas, especially where electrical power is unavailable or unreliable, there is a need for devices that are capable of powering user devices such as lights, radios, MP3 players, cell phones, or other devices, or are capable of charging batteries directly.

SUMMARY

A charging circuit according to some embodiments of the present invention includes a bootstrap circuit coupled to receive power from a solar cell and to charge a battery; a maximum power point (MPP) circuit coupled to receive power from the solar cell and to charge the battery, wherein the bootstrap circuit functions at a lower power level and the MPP circuit functions at a higher power level.

A method of charging a battery from a solar cell according to some embodiments of the present invention includes applying power from a bootstrap circuit when the battery has a very low state of charge or the solar cell has output below a threshold; and applying power from a maximum power point circuit when the battery and the solar cell provide power above the threshold.

These and other embodiments are further discussed below with reference to the following figures, which are incorporated in and considered a part of this disclosure.

DETAILED DESCRIPTION

Figure 1:
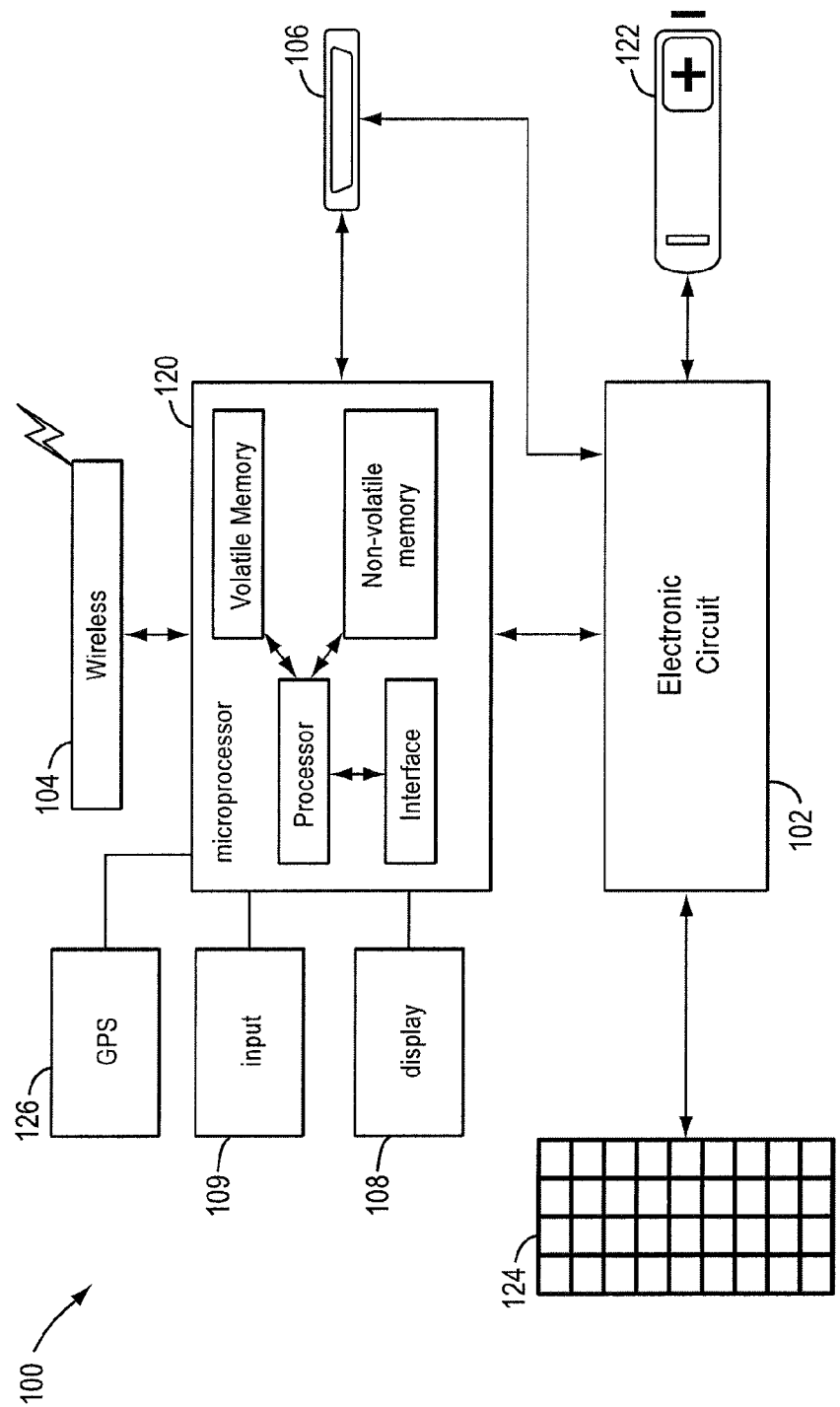
FIG. 1 illustrates an example of a charger according to some embodiments of the present invention.

Aspects of various embodiments of PSA according to the present invention are described below. One skilled in the art will recognize that particular embodiments of PSA according to the present invention can include any number of the individual features that are described. Further, one skilled in the art may recognize various modifications or alternatives to the particular embodiments described here. Those modifications and alternatives are intended to be within the scope of the present disclosure.

In accordance with the present invention, embodiments of a personal solar appliance (PSA) are presented. In some embodiments, a PSA can include a bootstrap circuit coupled to receive power from a solar cell and to charge a battery that functions at a lower level of power. In cases where the charge state of the battery is too low to support a normal charging function, therefore, the bootstrap circuit can charge the battery. When sufficient charge is placed on the battery, the charging electronics can become completely active and a maximum power point (MPP) circuit coupled to receive power from the solar cell and to charge the battery can be utilized. The bootstrap circuit functions at a lower power level and the MPP circuit functions at a higher power level. In some embodiments, the bootstrap circuit is shut off when the MPP circuit is functioning. In some embodiments, the bootstrap circuit operates when the battery is discharged to a level as to prevent the MPP circuit from functioning, or power generation from the solar cell is too low to support the MPP circuit. In some embodiments, then, the bootstrap circuit allows the PSA to charge a battery in any state, including fully discharged, from a solar cell.

Some embodiments of a PSA according to the present invention can include one or more solar cells; electronics coupled to the one or more solar cells; and a battery coupled to the electronics for storing the photovoltaic energy. In some embodiments, the electronics performs power, charge, and telemetry management. In some embodiments, the PSA further includes a system of cables and connectors to couple with user devices.

In some embodiments, the electronics includes a display for conveying status information. In some embodiments, the PSA includes an electrostatic touch sensor to request status information. In some embodiments, the PSA further includes a global positioning system and a transceiver wherein the system can report its position as measured by the global positioning system to a remote monitoring system with the transceiver. In some embodiments, the transceiver couples to an internet.

In accordance with some embodiments of the present invention, a personal solar appliance (PSA) is disclosed below. In some embodiments, the PSA includes photovoltaic cells, a battery, a connector to extract power from the PSA, and electronics to manage the power and charging of the battery. In some embodiments, the PSA includes status indicators to provide information on the photovoltaic performance and the battery charge state.

U.S. patent application Ser. No. 12/340,500, which is herein incorporated by reference in its entirety, describes a concentration system, a liquid crystal display or similar type display, and a customizable reflective layer to provide visual appeal for a device with a photovoltaic system. U.S. patent application Ser. No. 12/351,105, which is herein incorporated by reference in its entirety, describes an intelligent protective case with photovoltaic, battery, and electronics for use by an intelligent user device. U.S. patent application Ser. No. 12/351,105 also describes the architecture whereby software is obtained and installed for use on the intelligent user device including utilization of the Internet. MPP processing is described, for example, in V. Salas, E. Olias, A. Barrado, and A. Lazaro, *Review of the Maximum Power Point Tracking Algorithms for Stand-Alone Photovoltaic Systems*, SOLAR ENERGY MATERIALS AND SOLAR CELLS 90, (Elsevier 2006) at 1555-1578, which is herein incorporated by reference in its entirety.

FIG. 1 illustrates an embodiment of intelligent charger 100 consistent with the present invention. Intelligent charger 100 includes one or more solar panels 124, a battery pack 122, and a microprocessor 120. As shown in FIG. 1, microprocessor 120 can include a processor, volatile and non-volatile memory, and an interface. Programming and operating parameters can be stored in non-volatile memory while operating parameters and interim results can be stored in volatile memory. The interface allows microprocessor 120 to communicate, for example with wireless transceiver 104, physical connector 106, and electronic circuit 102. In some embodiments, intelligent charger 100 may include a display 108 and may further include a user input device 109 in order to communicate with a user. Additionally, microprocessor 120 may receive location data through a GPS device 126, which can be communicated either through connector 106 or through transceiver 104.

As shown in FIG. 1, microprocessor 120 is coupled to electronic circuit 102. Electronic circuit 102 is coupled to solar panel 124 and battery pack 122. In some embodiments, electronic circuit 102 can use a boost or buck mode of power management to output current and voltage compatible with battery 122 based upon incoming current and voltage from solar panel 124. Battery 122 can be any rechargeable battery, but in some embodiments is a lithium-ion polymer. Electronic circuit 102 is also coupled to physical connector 106 in order to provide a charging current and voltage to an external device (not shown) that is coupled to connector 106.

Electronic circuit 102 is coupled to microprocessor 120, which stores and executes charge management software. The charge management software operating on microprocessor 120 ensures that battery pack 122 and any battery coupled to connector 114 receives current and voltage appropriate to charge those batteries. As such, electronic circuit 102 receives power from solar panel 124 and converts that power to voltage and current appropriate to charge battery pack 122. Electronic circuit 102 may also convert power to voltage and current appropriate to charge a battery pack coupled to connector 106.

In some embodiments, electronic circuit 102 also includes monitoring electronics to monitor the power output and status of solar panel 124 as well as the charge and status of battery 122. In some embodiments, electronics 102 can also monitor the charge and status of a battery in a device coupled to connector 106. Microprocessor 120, then, can monitor and provide statistics on, for example, power production in solar panel 124, temperature, and battery charging.

As shown in FIG. 1, intelligent charger 116 may also include a wireless transceiver 104 that is coupled to microprocessor 120. Wireless transceiver 104 may include a cell phone transceiver and may be capable of communicating directly to servicers coupled to the internet. In some embodiments, wireless transceiver 104 may include a local transceiver such as, for example, a Bluetooth transceiver. In which case, intelligent charger 116 can communicate wirelessly smart devices or to personal computers through wireless transceiver 104.

In some embodiments, information regarding charging or discharging of battery 122 may be displayed on display 108. In some embodiments, a smart device coupled to connector 106 may communicate information to electronic circuit 102 that may then be displayed on display 108. Several status parameters can be provided on display 108. In some embodiments, display 108 may be an LCD device. Status information that may be displayed can include, for example, power produced by the solar cells, state of charge of the internal battery, power drawn by an external device, or any other parameter.

In some embodiments, an input device 109 can also be included. Input device 109 may be, for example, an electrostatic touch sensor or other user input device may be utilized so that a user may request status information from the PSA.

In some embodiments, the PSA can include a global positioning system (GPS) 126 to determine its position. In some embodiments, the PSA can also include a transceiver 104 that can communicate with a remote system via wireless communications or an internet link in order to report its position and status. In some embodiments, the PSA can report to the remote system when prompted by the remote system. In some embodiments, the PSA can report its position and a fault condition to the remote system. A telemetry system that can be utilized for connecting the PSA to a remote monitoring system is described in U.S. patent application Ser. No. 12/351,105. In general, position, statistical data, or fault conditions can be reported to a remote monitor.

Connector 106 of PSA 100 can be utilized to provide power, telemetry, and configuration management. Connector 106 can be one or more of the families of USB connectors (microUSB, miniUSB, and USB), which may be appropriately protected for outdoor protection when used on PSA 100. The USB family is able to perform telemetry functions from the PSA and enables the PSA to be configured by a remote computer. Power is delivered by the PSA using a female axial power connector that, in some embodiments, is waterproof and structurally strong. The non-PSA side of the cable may have a number of different devices to receive the power. The power supplied could be at a number of different voltages. The USB family is supplied 5 V at 500 mA. A cigarette lighter adaptor would take over 13 V at several amps if possible. Other variations are possible. In order to determine what voltage and current should be provided, the PSA can use a sense resistor on a cable pin to determine the nature of the load and dynamically adjust the voltage of its power output accordingly.

Charging battery 122 from solar cell 124 is performed by electronics 102. Photovoltaic systems produce power in the form of voltage and current. Some embodiments of PSA can operate in a low power interval, during which it can store power in battery 122 and provide power from battery 122 to a variety of devices coupled to connector 106. In some embodiments, the PSA can have an architecture where a very low power bootstrap circuit runs for a number of reasons, for example battery 122 is totally discharged or there is very little photovoltaic power available. In some embodiments, the bootstrap circuit can turn on at powers that are extremely low, for example as low as 0.002 watts. At that point the PSA will begin to trickle charge battery 122. In some embodiments, if battery 122 is not discharged, a more sophisticated circuit, a maximum power point (MPP) tracking circuit, can be utilized. In some embodiments, the MPP circuit can also operate with fairly low power, for example as low as 100 mW. As such, according to some embodiments of the present invention electronics 102 can include both a low power bootstrap circuit and a maximum power point tracking circuit.

Although solar cells 124 can include any number of individual solar cells, in some solar power applications it is advantageous that solar cells 124 includes a single solar cell to generate power. A single solar cell presents special circuit problems because the voltage generated from a single solar cell is very low, typically 0.4 to 0.6 volts. Usually circuits are designed to extract power from the cell, but operate on a battery, battery 122, running at a higher voltage. In order to operate correctly, a boost power supply is utilized to boost the voltage produced by the solar cell to that applicable to battery 122.

Some embodiments of PSA 100 according to the present invention provide for charging of battery 122 in any charge state, including completely discharged, from solar cell 124 with no other source of power provided. In some embodiments, a greater than 50% efficiency in recharging battery 122 can be achieved utilizing a bootstrap circuit in electronics 102, which is a low voltage charging circuit that is inexpensive and easily integrated into a high efficiency converter. The high efficiency converter in electronics 102 operates if the battery is at sufficient charge. While the sufficient charge is small, it is still greater than zero. The operation of the MPP circuit preempts the operation of the Bootstrap circuit if the solar power input is sufficient and the battery is adequately charged.

The low-voltage bootstrap circuit, including fly-back circuits within the low-voltage bootstrap circuit, can be controlled by an MPP tracking circuit. MPP tracking is well known in the art as the method to maximize the power output of finite impedance voltage sources like solar cells. MPP tracking is well described in Salas et al.

Figure 2A:
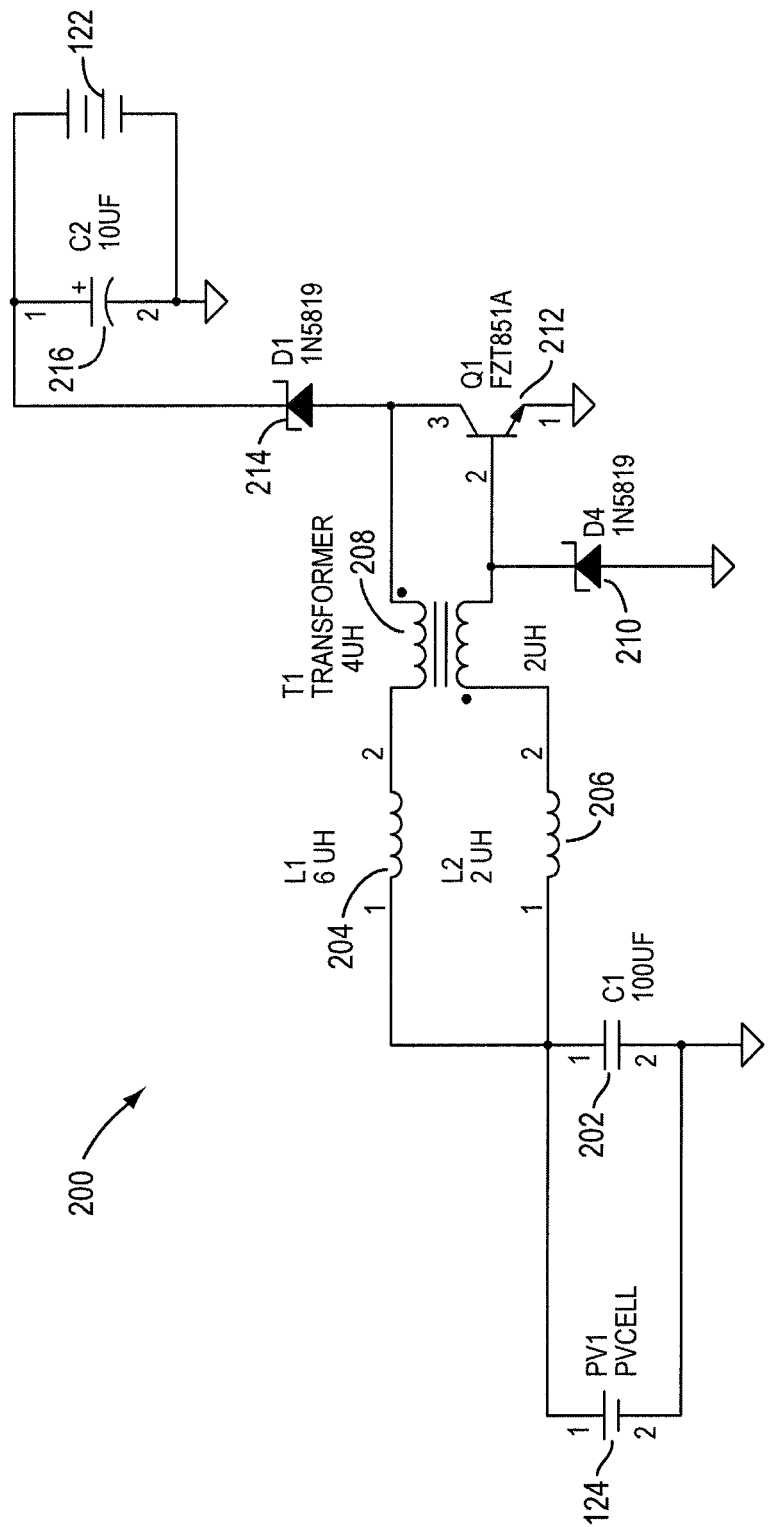
FIG. 2A illustrates an example bootstrap circuit according to some embodiments of the present invention.

FIG. 2A shows an embodiment of a bootstrap circuit 200 according to the present invention. Bootstrap circuit 200 includes a transistor 212, a transformer 208 coupled to transistor 212, and a diode 214 that is coupled to transistor 212 and to transformer 208. With that configuration, bootstrap circuit 200 functions as an oscillator. In some embodiments, the bootstrap circuit is disabled by shorting out transistor 212 with another transistor. In some embodiments, an MPP circuit determines whether to disable bootstrap circuit 200 when it determines that it can operate. In some embodiments, one or more diodes are placed in series with the bootstrap circuit transistor base permitting multiple cells placed in series to operate at or near the optimum power point during bootstrap operation. In some embodiments, transformer 208 has significant leakage inductance with coupling coefficient between 0.2 and 0.8. In some embodiments, a sense resistor is placed on a connection pin to determine the voltage requirement of the load.

The embodiment of bootstrap circuit 200 further includes a filter capacitor 202 coupled across solar cell 124. Inductors 204 and 206 also provide filtering and are coupled in series with transformer 208. In some embodiments, inductors 204 and 206 can be combined with transformer 208. A capacitor 216 can also be coupled across battery 122, which is coupled to diode 214. A protection diode 210 can also be coupled between transformer 208 and ground.

The values provided in FIG. 2A in the circuit are exemplary; however, many different combinations of component values may be utilized. As shown in FIG. 2, transformer 208 can be a 4 µH/2 µH transformer. Capacitor 202 can be a 100 µF capacitor. Inductor 204 can be a 6 µH inductor and inductor 206 can be a 2 µH inductor. Capacitor C2 can be a 10 µF capacitor. However, these values and components are dependent on circumstances and different combinations of components and values may be utilized.

Converting the approximately 0.5 volts generated by a single solar cell 124 to a voltage required to charge a battery 122 (typically 4 volts) is accomplished with a boost converter. A typical boost converter is a flyback circuit. A flyback circuit primarily includes a transistor, a coil, and a freewheeling diode. In FIG. 2A, this combination is supplied by transistor 212, the primary of transformer 208, and flyback diode 214, respectively. The coil of transformer 208 is charged by transistor 212 with current from solar cell 124, and then when transistor 212 turns off, the voltage on the coil of transformer 208 rapidly goes up until diode 214 is in conduction, and the charge in the coil of transformer 208 is discharged into battery 122. Thus power is transferred from solar cell 124 to battery 122.

Solar cell 124 generates some voltage, which may be as low as 0.45 volts. Transistor 212, through inductor 204 and transformer 208 secondary, has the 0.45 volts of the cell applied between its base and emitter junction. Although this voltage is very low, it will bias the transistor into its linear region. Transformer 208 acts as an inverting feedback for bootstrap circuit 200. Once transistor 212 is biased into its linear region, it exhibits voltage gain. The voltage gain at high frequency is very large because the load on transistor 212 collector is inductive, which looks more like an open circuit as the frequency goes up.

Transistor 212 subsequently turns on, pulls the collector to near zero volts, which charges the collector inductor and increases the drive to the base of transistor 212. Transistor 212 subsequently goes on hard, increasing the charging of the collector inductor. The collector inductor charges and pulls more current from the collector. This causes the base emitter voltage to increase by virtue of the effect of the $H_{re}$ (H parameter, reverse transfer common emitter) of transistor 212—the increase in base voltage with collector current. Eventually this voltage gets high enough that transistor 212 begins to go off. Also contributing to the turnoff is drop on the solar cell voltage and drop on the secondary of transformer 208.

If the collector current drops even a little bit, the voltage on the collector of transistor 212 will quickly rise because the collector acts as a current source. The collector will fly up until diode 214 begins to conduct, and the primary of transformer 208 will discharge through diode 214 into battery 122. Note that as soon as the collector begins to rise, the feedback from transformer 218 rapidly turns transistor 212 off.

Once the collector inductor, the primary of transformer 208, is discharged, transformer 208 settles back to its idle state, the voltage from solar cell 124 is applied to the base of transformer 208 again, and the cycle repeats. Diode 210 is used to reset the transformer secondary current. Capacitors 202 and 216 are filter capacitors. The circuit will operate without diode 210, but may be more efficient with diode 210 in the circuit.

Note that inductors 204 and 206 and transformer 208 can be lumped into a single transformer. In some embodiments, the coupling factor should be less than one. Typical coupling factors that work well are from 0.2 to 0.7, typically 0.4. Using a low coupling transformer saves components and money. Circuit 200 typically will operate without inductors 204 and 206, or with a highly coupled transformer 208, but the performance may be degraded.

In some embodiments, circuit 200 shown in FIG. 2A can operate with solar cell voltages significantly less than would be expected from the 0.6 volt Vbe (base-emitter voltage) requirement of transistor 212. The reasons for this are 1) transistor 212 can get into its linear range at below 0.5 volts Vbe, and 2) when solar cell 124 is unloaded its voltage rises above 0.5 volts, then when the oscillation starts the voltage can go significantly below 0.5 volts, even down to 0.3 volts. The solar cell voltage behavior makes circuit 200 self-starting.

The frequency of the oscillation changes substantially with solar cell current. At very low currents with the values described above for circuit 200 as shown in FIG. 2A, the oscillation can be as high as 200 kHz. As the current into cell 124 from light impinging on cell 124 increases, the oscillation frequency decreases. With an incident light energy high enough to produce 3 amps in solar cell 124, the frequency might be as low as 20 kHz. Operating frequencies can be adjusted by adjusting the values of the inductance of inductors 204 and 206 as well as the inductances in transformer 208. Inductance values described above are typical, but it is understood that inductors 204 and 206 could be much smaller to operate at higher frequency, or much larger to operate at lower frequency.

Figure 2B:
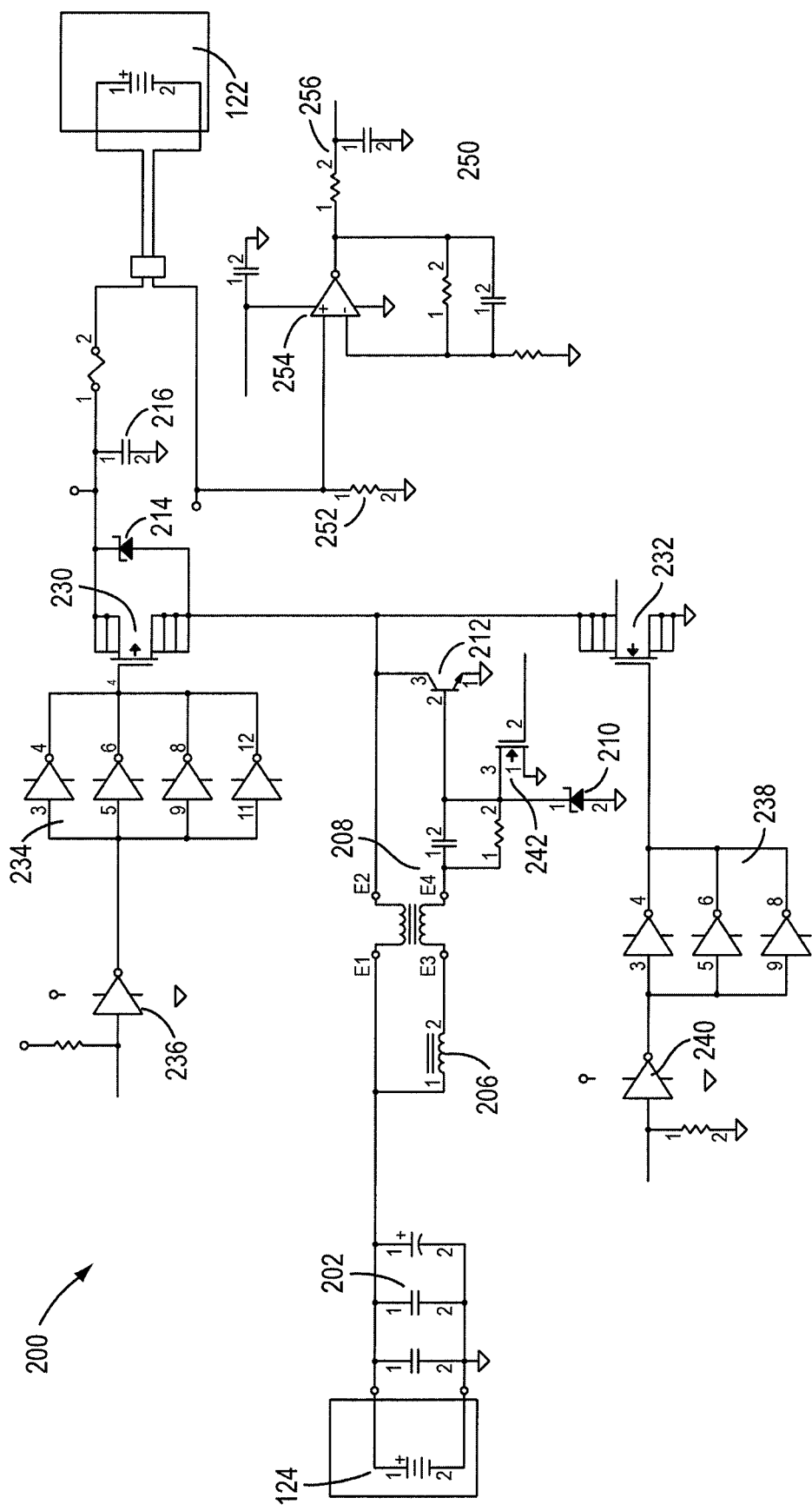
FIG. 2B illustrates an example bootstrap circuit according to some embodiments of the present invention.

FIG. 2B illustrates an enhanced embodiment of circuit 200 as illustrated in FIG. 2A. The embodiment of circuit 200 illustrated in FIG. 2B can make advantageous use of the change in frequency described above. As shown in FIG. 2B, power FET transistor 230 is coupled across diode 216 and power FET transistor 232 is coupled between diode 214 and ground. The gate of transistor 232 is driven by power inverters 234 and 236 that is driven from the battery and a high voltage signal. Similarly, the gate of transistor 232 is driven by inverters 238 and 240, which are driven by a pulse-wave modulation signal (PWM). Further, monitor circuit 242 provides a signal that indicates when boot circuit 200 should be turned off.

At lower frequencies, the collector inductance (the primary) of transformer 208 charges to higher currents, and so power through circuit 200 increases commensurately with solar power input. At lower frequencies, the charge on battery 122 becomes high enough to start power inverters 236, 234, 240, and 238, further enhancing the charging. Depending on solar cell 124 and transistor 212, the performance can be roughly matched so the power from cell 124 is close to the maximum power point, where the cell voltage times the external current is maximized. The MPP is not actively tracked, but it is close enough so that until battery 122 has charged enough for a formal MPP tracking circuit to start, Bootstrap circuit 200 shown in FIG. 2B pulls a significant percentage of the available power from solar cell 124.

The circuit shown in FIG. 2B has embedded in it a flyback converter of the type described above with respect to FIG. 1B. In the case of circuit 200 of FIG. 2B, the flyback converter can be formed by transistor 232, diode 216, and the coil formed by the combination of inductor 204 and the primary of transformer 208. Under moderate power conditions transistors 212 and 230 are not used. Transistor 230 is kept off by leaving the signal HISIDE high. Transistor 212 is held off by keeping the signal BOOTOFF low, which turns transistor 242 on and keeps transistor 212 off.

At higher currents and powers, the major source of loss in this flyback circuit is freewheeling diode 214. The purpose of transistor 212 in the embodiment of circuit 200 shown in FIG. 2B is to go on at the same time as diode 214 would conduct, but the power loss of transistor 230 is very much less than diode 214, so the circuit becomes more efficient by using transistor 230 instead. This is called active or synchronous rectification. Circuit 200 as shown in FIG. 2B uses active rectification when the power and current delivered from solar cell 124 is very large and diode 214 becomes a significant source of loss. Note also that the active rectification is typically used only when the converter goes into continuous conduction mode, wherein the inductor current through transformer 208 stays relatively constant through the entire switching cycle, and never drops to zero.

There are times, such as the case of a discharged battery or very low solar illumination, when running the flyback circuit is either impractical or impossible. For example, if the battery has too low a voltage, the microprocessor and logic and transistors 232 and 212 cannot be turned on. Since the microprocessor and switching circuits might take 100 milliwatts to operate, if the solar input is less than 100 milliwatts it is impractical to operate the flyback circuit. The purpose of the circuit including transistor 212 is to act as a flyback circuit that has very low power consumption and can operate with solar voltages as low as 0.3 volts. In other words, the embodiment of circuit 200 shown in FIG. 2B becomes the embodiment of circuit 200 shown in FIG. 2A under very low power conditions.

The low power bootstrap circuit operation detail has been described. Essentially it is a self starting oscillator using transformer 208 as feedback around the transistor 212. When transistor 212 is operating, BOOTOFF is an open circuit. The transistor 212 goes on and off as a flyback, and diode 214 acts as the freewheeling diode. Transistors 230 and 232 are off.

The circuit shown in FIG. 2B can be operated with one solar cell, or with more solar cells with minor modifications. Bootstrap circuit 200 is particularly useful when the solar cell stack voltage is insufficient to operate the microprocessor, which typically takes 2.5 volts or more. Bootstrap circuit 200 does not track the MPP, but by selecting components correctly the circuit will tend to operate near the MPP voltage of the cell. Bootstrap circuit 200 can be between 50% and 80% efficient, so that at low power it is much more practical to use than the microprocessor. For example, at 200 milliwatts from the solar cell, the microprocessor is about 90% efficient, but also takes 100 milliwatts to operate. The net output power is only 90 milliwatts. With the bootstrap circuit at this power level and 75% efficiency it delivers about 150 milliwatts to the battery.

The transition to transistors 230 and 232 operation and subsequently to MPP mode can be managed by a microprocessor. Periodically the microprocessor wakes up from its sleep mode (100 microwatt power consumption) and sees how much power the bootstrap is delivering. If it is above the crossover point where the MPP circuit can supply more power to the battery, it turns off the bootstrap with BOOTOFF low, and begins the normal flyback operation. Conversely, if the power drops to the point where the bootstrap would be more efficient, the microprocessor turns the bootstrap on, turns off the main flyback, and goes to sleep. If the battery is too low for the microprocessor to operate, the bootstrap circuit is enabled, and the bootstrap will charge the battery until the microprocessor has sufficient voltage and conditions to turn the bootstrap off.

In some embodiments, a current circuit sensing circuit 250 can provide a signal related to the amount of current being supplied through battery 122. As shown in FIG. 2B, current sensing circuit 250 includes a resistor coupled between the negative terminal of battery 122 and ground and an amplifier 254 coupled to receive the voltage from the negative terminal of the battery. A signal 256 indicates the amount of current through battery 122 and thereby can provide information about the power output of solar cell 124 and the charge state of battery 122. Signal 256 can be utilized by an MPP circuit to determine whether conditions are appropriate to engage the MPP circuit. The MPP circuit may also utilize current signal 256, in some cases along with a voltage measurement across battery 122, to monitor the power supplied to battery 122.

Figure 3:
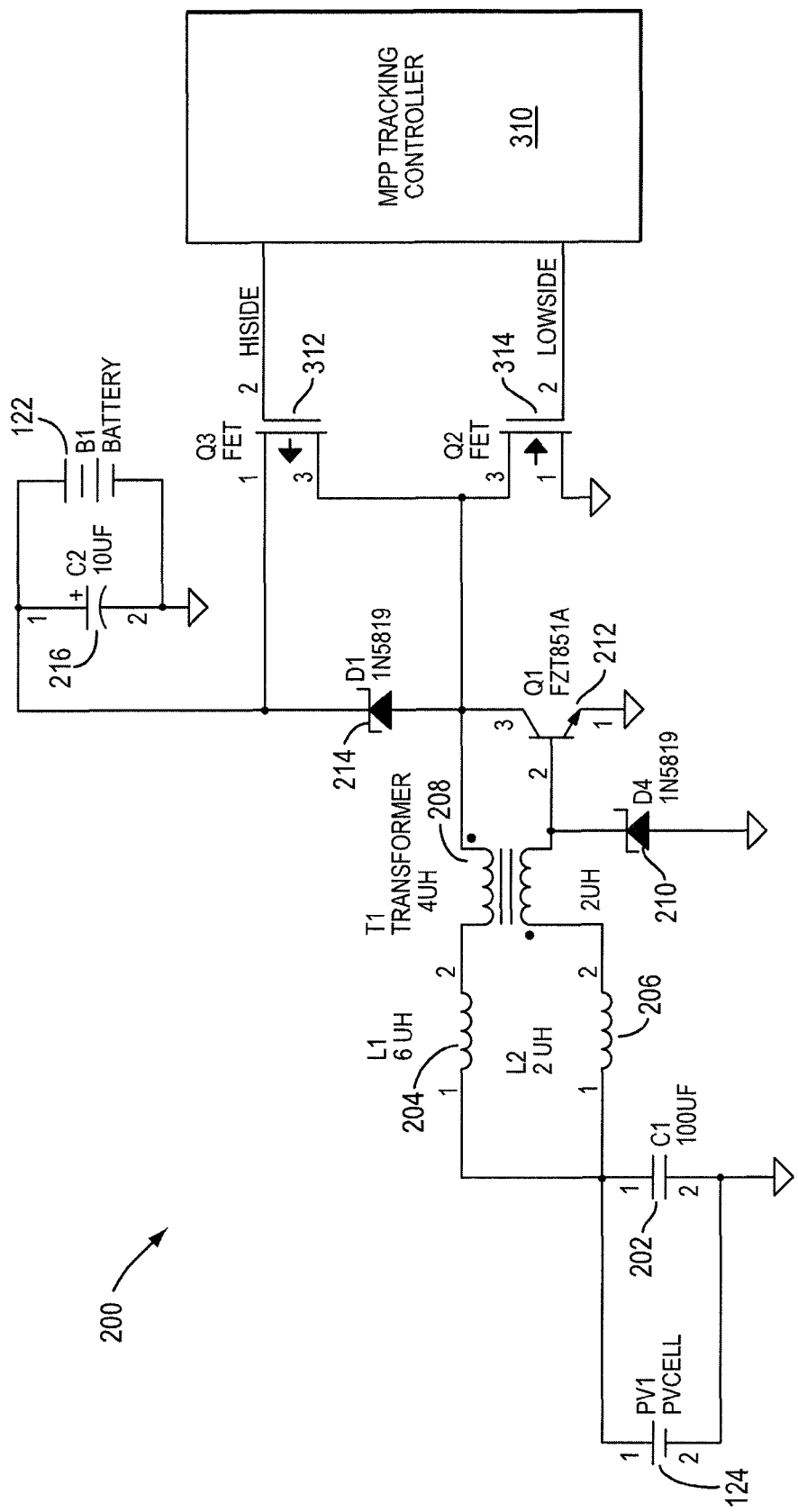
FIG. 3 illustrates the bootstrap circuit shown in FIG. 2 interconnected with a maximum power point circuit, in accordance with some embodiments of the present invention.

FIG. 3 illustrates boot circuit 200 coupled with a maximum power point (MPP) control circuit 310. Boot circuit 200 as shown in FIG. 2A is shown in FIG. 3 for simplicity only. The embodiment of boot circuit 200 shown in FIG. 2B, or other embodiments, may be utilized instead.

MPP circuit 310 is coupled to control the gates of transistors 312 and 314. The drain of transistor 312 is coupled to the drain of transistor 314. The source of transistor 312 is coupled to the battery side of diode 214. The source of transistor 314 is coupled to ground. The primary of transformer 208 is coupled to the drain of transistor 312. As with a typical MPP controller, MPP controller 310 monitors the power into battery 122 as a function of the switching duty cycle, and the duty cycle that creates the most power into the battery is maintained. Monitoring the power into battery 122, or out of solar cell 124 are both valid metrics of MPP performance and both have been used in the MPP calculation. FIG. 2B shows current monitoring circuit 250, which monitors the current flowing through battery 122. Optimum power is established for the MPP process in the microprocessor by multiplying the current at point I and the voltage measured across the battery. MPP tracking controller 310 can run when a certain amount of power is available. For example, a boost circuit, microprocessor, drivers, and the like might take 100 milliwatt or more to operate. This means that if solar cell 124 is delivering less than 100 mW, it isn't practical to start MPP controller 310 because it would take more power to operate than would be obtained from solar cell 124. With embodiments that include a bootstrap circuit 200 as described above, however, the MPP circuit can remain off when solar cell 124 is delivering less than, for example, 100 mW, and Bootstrap circuit 200 can still charge battery 122. If the input power becomes sufficient to operate the MPP tracking circuit, the MPP tracking circuit can be turned on and can take over for the Bootstrap circuit.

In some embodiments of the invention, transformer 208 coupled to the collector of transistor 212 can be utilized as the MPP tracking controller's boost inductor, providing significant cost savings. Furthermore, if circuit 200 is configured so that the MPP circuit pulse frequency is higher than the operating frequency of Bootstrap circuit 200, when the MPP circuit starts up it will quench the oscillation of Bootstrap circuit 200 and Bootstrap circuit 200 will effectively drop out of the charging circuit. This behavior is obtained if the MPP boost switch, formed as transistors 312 and 314, is placed in parallel with Bootstrap transistor 214, as shown in FIG. 3. The flyback diode 214 is used by the MPP circuit at low power levels, in combination with transistor 314, to boost the cell voltage to the battery voltage. If the MPP current into the battery is high enough, and diode 214 becomes a major source of circuit loss, transistor 312 is turned on at the same time as diode 214 would normally conduct, and act as an active rectifier, increasing the circuit efficiency.

Figure 5:
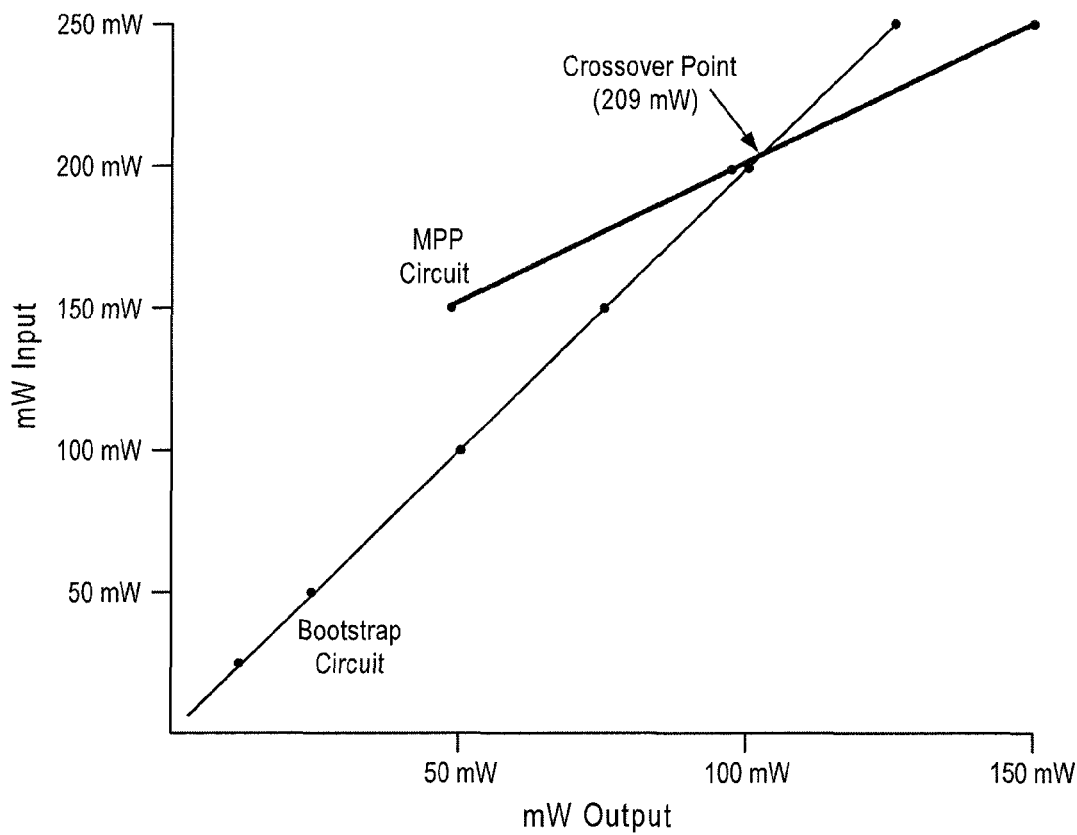
FIG. 5 illustrates a crossover point where an MPP circuit should function and an embodiment of bootstrap circuit such as that shown in FIGS. 2A and 2B should be turned off.

The low power bootstrap circuit and the MPP circuit have different operating efficiencies. This means there will be a cross-over point where it makes sense to run MPP circuit 310 if the photovoltaic power is higher. FIG. 5 illustrates this cross-over point. The assumptions in FIG. 5 are a 50% efficient bootstrap circuit 200 and a 95% efficient MPP circuit 310. In some embodiments, MPP circuit 310 is also more efficient at the management of battery charging.

In some embodiments, MPP circuit 310 in low wattage applications operates when the available power from the solar cell is greater than a fixed value, for example about 100 mW. When less power than the fixed value is available, MPP circuit 310 operates from battery 122. However, operating MPP circuit 310 from battery 122 discharges battery 122. In some embodiments, bootstrap circuit 310 can operate with about 2 mW of power production from solar cell 124. Assuming bootstrap circuit 310 runs at 50% efficiency, then a 100 mW input would allow Bootstrap circuit 200 to provide 46 mW of power into charging battery 122, as opposed to draining battery 122 if MPP circuit 310 is running. If MPP circuit 310 runs at 95% efficiency then 209 mW is about at the cross over point where MPP circuit 310 is more effective at providing power to battery 122 than bootstrap circuit 200.

If the voltage provided by solar cell 124 is below a few volts, then a boost transformation can be utilized to raise the voltage to a level usable by the solid state logic of MPP circuit 310. If the voltage provided is several volts, then a buck transformation can be utilized to lower the voltage to the level usable by MPP circuit 310.

If the photovoltaics in solar cell 124 generate low voltage, there may be inadequate power for the boost transformation to occur. Battery 122 could be used to run the electronics but this is problematic if battery 122 is completely drained. This situation (insufficient light, low voltage from the photovoltaics, and or a drained battery) make the case for having a power regulation architecture that consists of a low power boost circuit 200 coupled with an MPP circuit 310 as shown in FIG. 3.

In some embodiments, in low power conditions bootstrap circuit 200 is operational and MPP circuit 310 is asleep, but occasionally testing if the photovoltaic power is high enough to merit operation. If battery 122 lacks sufficient power, MPP circuit 310 does not start. If battery 122 is full, MPP circuit 310 does not allow bootstrap circuit 200 to operate and otherwise does not further charge battery 122. In low power conditions, MPP circuit 310 may draw approximately 100 µW while asleep. This would yield approximately 2.1 mW for the bootstrap circuit 200 and the sleeping MPP circuit 310. This is almost 50 times less than the power requirements of an operational MPP circuit 310.

Figure 4:
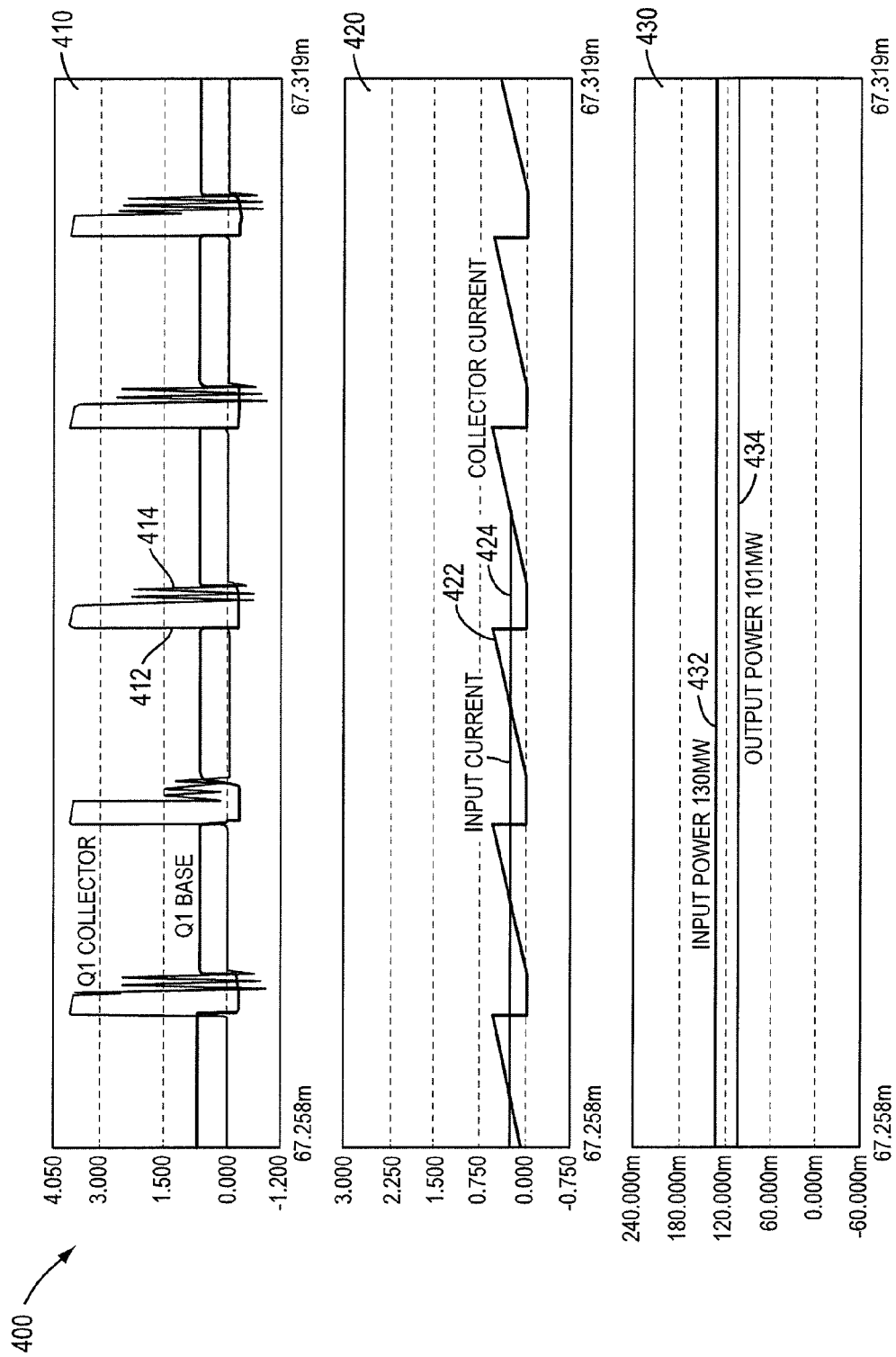
FIG. 4 shows a simulation of operation of the embodiment of bootstrap circuit shown in FIG. 2A, utilizing typical values.

FIG. 4 shows a simulation 400 of circuit 200 combined with MPP circuit 310 utilizing typical values for each of the components. In FIG. 4, graph 410 shows bootstrap transistor 212 collector signal 412 and base signal 414. Transistor 212 operates as an oscillator, but the waveforms are the same as a conventional flyback converter. Graph 420 shows the collector current of transistor 212, increasing with the charging of inductor 208 and 204. Graph 420 also shows the input current 424 from solar cell 124, which optimally should be pure DC current as shown in Graph 420. Graph 430 shows total input power 432 at 130 milliwatts, and output power 434 to the batter of 101 milliwatts, representing a 77.6% net efficiency of battery charging by bootstrap circuit 200. Note that it is not necessary to combine bootstrap circuit 200 with MPP circuit 310. Bootstrap circuit 200, for example, could be set up to supply small currents to battery 122, and it can be operating all the time. Also, it is possible to turn off bootstrap circuit 200 when it is not required, for example when battery 122 is fully charged and the charging circuit needs to be turned off.

Also note that bootstrap circuit 200 can be used by MPP controller 310 to know when it should wake up and take over the charging process. MPP circuit 310 can be generally in a low power mode, and wake up and look at power from bootstrap circuit 200 periodically. If MPP control circuit 310 detects sufficient power going into battery 122 to justify turning on, it can turn on and increase the net efficiency to 95%. Turning on MPP controller 310 will generally be advantageous when the increase in efficiency makes up for the power required by MPP controller 310. For example, if bootstrap circuit 200 runs at 50% efficient and MPP circuit 310 runs at 95% efficient but requires 100 mW to operate, MPP circuit 310 should turn on when 45% of the input power equals 100 mW, or about 222 mW. This kind of process can easily be programmed into MPP controller 310.

In some embodiments, solar cell 124 may include multiple cells that can be utilized in series. In some embodiments, a diode may be placed in series with the base of transistor 212 so that multiple cells can be placed in series and bootstrap circuit 200 will still draw close to optimum power from solar cells 124. Without the diode, multiple cells in series still work, but the voltage on the cells may be below the optimum power point. By proper selection of the diode so that it has proper forward conduction voltage, a close match to the correct series connected voltage is obtained across the solar cells for maximum power.

Figure 6:
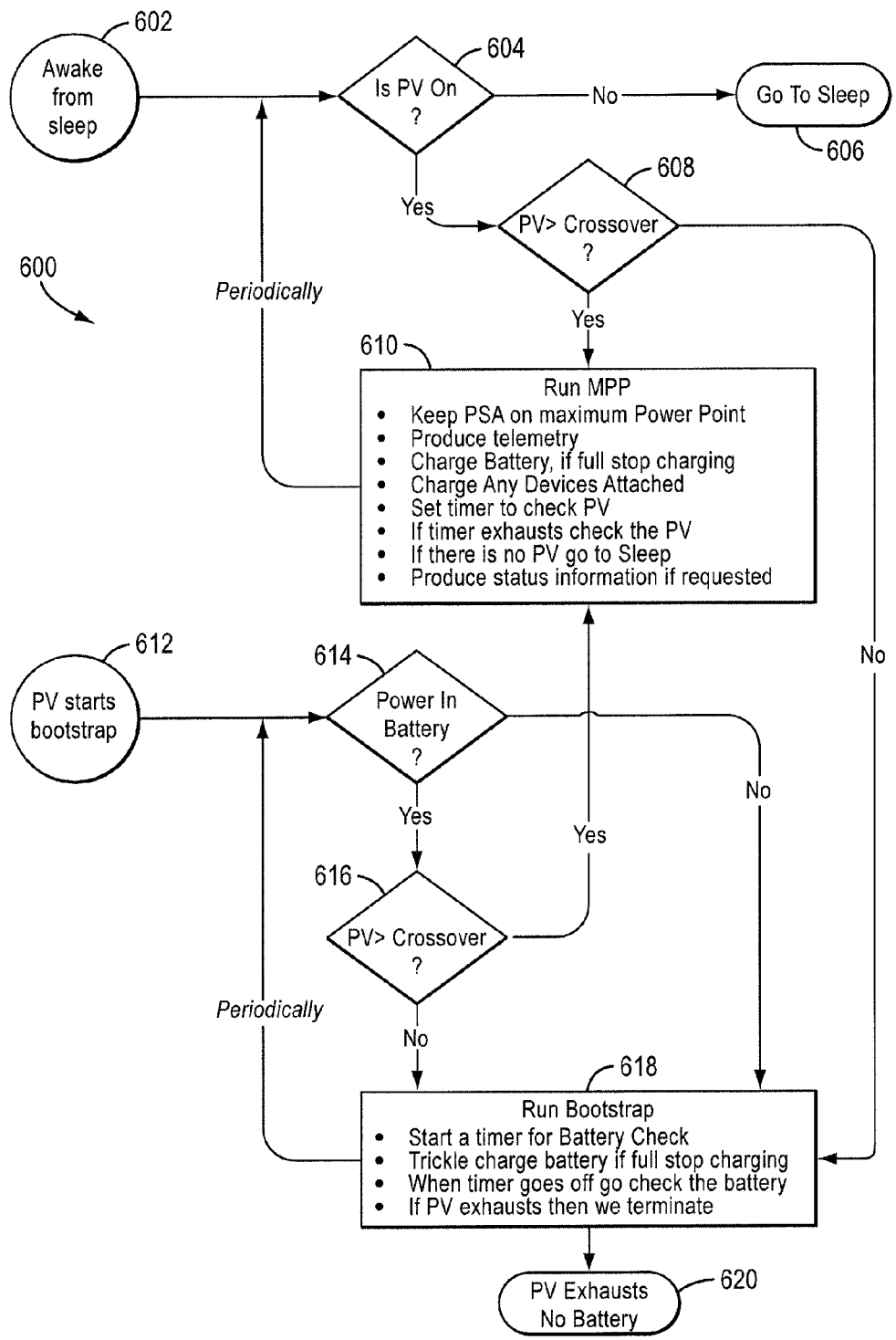
FIG. 6 illustrates a flowchart of an example algorithm for the relationship between the bootstrap circuit and the MPP circuit according to some embodiments of the present invention.

FIG. 6 illustrates a process 600 for some embodiments of PSA with a boost circuit 200 illustrated in FIGS. 2A, 2B, and 3. Process 600 is executed in MPP tracking circuit 310 as shown in FIG. 3. Further, parts of the functions of MPP tracking controller 310 may be executed in microprocessor 120 as shown in FIG. 1, or by a microprocessor within electronic circuit 102.

As shown in FIG. 6, MPP controller 310 awakens periodically and checks to see if the solar cell is on. If not, then the MPP goes back to sleep. In step 602, MPP controller 310 wakes. Process 600 then transitions to step 604 were MPP controller 310 checks to see if bootstrap circuit 200 is active. If bootstrap circuit 200 is not active, then process 600 process to step 606 where MPP controller 310 returns to the sleep state. MPP controller 310 remains in a sleep state for a preset amount of time before restarting step 602.

If solar cell 124 is generating and bootstrap circuit 200 is on, then from step 604 process 600 proceeds to step 608. In step 608, the power supplied to battery 122 is checked to see if it is over the crossover point, as was discussed with respect to FIG. 5. If not, the process 600 proceeds to run bootstrap 618. During step 618, bootstrap circuit 200 provides power to battery 122 as described above. From step 608, if the power available is over the crossover point, then MPP circuit 310 is operated. During the time when MPP circuit 310 is operating, then process 600 proceeds back to step 604 periodically to check whether solar cell 124 is still generating power, and stopping when battery 122 is fully charged and there is no external device to charge directly.

From step 608, if the solar cell output is below the crossover point, then bootstrap circuit 200 is started to trickle charge the battery in step 618. Periodically, process 600 proceeds to step 614 where battery 122 and solar cell 124 are checked for operation. If solar cell 124 stops producing, then bootstrap circuit 200 stops trickle charging battery 122 and process 600 proceeds to terminate in step 620 and only wakes back up when the solar cell starts producing again, as indicated in step 612.

If, in step 614, there is insufficient power in battery 122, process 600 proceeds back to step 618 to continue operation of bootstrap circuit 200. However, if there is power in battery 122 then process 600 proceeds to step 606 where the power available is checked to see if it is over the crossover point. If not, then process 600 proceeds back to step 618. If the power is over the crossover point, then process 600 proceeds to step 610 to operate MPP circuit 310.

Embodiments described here are exemplary of the invention only and are not to be considered limiting. One skilled in the art may apply variations or modifications of the examples provided here. Those variations and modifications are intended to be within the scope of this disclosure. As such, the invention is limited only by the following claims.

What is claimed is:

1. An apparatus comprising:
   a bootstrap circuit coupled to receive power from a solar cell and to charge a battery; and
   a maximum power point (MPP) circuit coupled to receive power from the solar cell and to charge the battery;
   wherein the bootstrap circuit functions at a lower power level and the MPP circuit functions at a higher power level;
   wherein the bootstrap circuit includes
      a transistor,
      a transformer coupled to the transistor, and
      a diode that is coupled to the transistor and the transformer,
   wherein the bootstrap circuit functions as an oscillator.

2. The apparatus of claim 1, wherein the bootstrap circuit is shut off when the MPP circuit is functioning.

3. The apparatus of claim 1 where the bootstrap circuit operates when the battery is discharged to a level as to prevent the MPP circuit from functioning.

4. The apparatus of claim 1 wherein the bootstrap circuit charges the battery in any state, including fully discharged, from the solar cell.

5. The apparatus of claim 1, wherein the bootstrap circuit provides a signal that is utilized to indicate when the MPP circuit turns on and disables the bootstrap circuit.

6. The apparatus of claim 1, wherein the bootstrap circuit is disabled by shorting out the transistor with another transistor.

7. The apparatus of claim 6, wherein the MPP circuit determines whether it operates and disables the bootstrap circuit during its operation.

8. The apparatus of claim 1, wherein one or more diodes are placed in series with the bootstrap circuit transistor base permitting multiple cells placed in series to operate at or near the optimum power point during bootstrap operation.

9. The apparatus of claim 1, wherein the transformer has significant leakage inductance with coupling coefficient between 0.2 and 0.8.

10. The apparatus of claim 1, wherein a sense resistor is placed on a connection pin to determine a voltage requirement of the load.

11. An apparatus comprising:
   a bootstrap circuit coupled to receive power from a solar cell and to charge a battery; and
   a maximum power point (MPP) circuit coupled to receive power from the solar cell and to charge the battery;
   wherein the bootstrap circuit functions at a lower power level and the MPP circuit functions at a higher power level;
   wherein the bootstrap circuit includes
      a transformer coupled to receive current from the solar cell;
      a first transistor with a gate coupled to a secondary of the transformer, a source coupled to a primary of the transformer, and a drain coupled to ground;
      a second transistor with a source coupled to the primary of the transformer, a drain coupled to ground, and a gate coupled to receive a pulse-width modulation signal;
      a third transistor with a source coupled to the source of the second transistor, a drain coupled to a positive side of the battery, and a gate coupled to receive a highside signal;
      a flyback diode coupled between the source and the drain of the third transistor,
      wherein a low power charger is formed with the transformer, the first transistor, and the flyback diode and an intermediate power charger is formed with the transformer, the second transistor, and the flyback diode.

12. An apparatus, comprising:
   one or more solar cells;
   a battery; and
   charging electronics coupled to the one or more solar cells and to the battery, the charging electronics including a booststrap circuit that charges the battery during periods of low power production and a maximum power circuit that charges the battery when sufficient power is produced;
   wherein the bootstrap circuit includes
      a transistor,
      a transformer coupled to the transistor, and
      a diode that is coupled to the transistor and the transformer,
   wherein the bootstrap circuit functions as an oscillator.

13. The apparatus of claim 12, wherein the electronics performs power, charge, and telemetry management.

14. The apparatus of claim 12, further including a system of cables and connectors coupled to the charging electronics to couple with user devices.

15. A method of charging a battery from a solar cell, comprising:
   applying power from a bootstrap circuit when the battery has a very low state of charge or the solar cell has output below a threshold; and
   applying power from a maximum power point circuit when the battery and the solar cell provide power above the threshold;
   wherein the bootstrap circuit includes
      a transistor,
      a transformer coupled to the transistor, and
      a diode that is coupled to the transistor and the transformer,
   wherein the bootstrap circuit functions as an oscillator.

16. The method of claim 15, wherein the threshold is a crossover point between an efficiency of the bootstrap circuit and an efficiency of the maximum power point circuit.

* * * * *